United States Patent
Ogino

(10) Patent No.: US 8,208,046 B2
(45) Date of Patent: Jun. 26, 2012

(54) METHOD OF DETECTING DEFECT IN IMAGE PICKUP APPARATUS AND THE IMAGE PICKUP APPARATUS

(75) Inventor: Hiroshi Ogino, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 112 days.

(21) Appl. No.: 12/892,815

(22) Filed: Sep. 28, 2010

(65) Prior Publication Data

US 2011/0080505 A1  Apr. 7, 2011

(30) Foreign Application Priority Data

Oct. 5, 2009 (WO) ............... PCT/JP2009/067353

(51) Int. Cl.
*H04N 5/232* (2006.01)
*G03B 13/00* (2006.01)

(52) U.S. Cl. .................. 348/246; 348/247

(58) Field of Classification Search .......... None
See application file for complete search history.

(56) References Cited

U.S. PATENT DOCUMENTS

| 2005/0078204 | A1* | 4/2005 | Matsuoka et al. | 348/247 |
| 2008/0056606 | A1* | 3/2008 | Kilgore | 382/275 |
| 2008/0117318 | A1 | 5/2008 | Aoki | |
| 2010/0073526 | A1* | 3/2010 | Watanabe et al. | 348/247 |

FOREIGN PATENT DOCUMENTS

| JP | 2003-037781 A | 2/2003 |
| JP | 2008-042780 A | 2/2008 |
| JP | 2008-131273 A | 6/2008 |
| JP | 2008-311834 A | 12/2008 |

\* cited by examiner

*Primary Examiner* — Justin P Misleh

(74) *Attorney, Agent, or Firm* — Carter, DeLuca, Farrell & Schmidt LLP

(57) ABSTRACT

Whether or not a pixel output signal corresponding to a previously stored blinking defective pixel address is an abnormal value is detected. Then, when a signal value indicating a defective pixel is being output, the output signal is corrected. Deterioration of a taken image caused by excessively correcting a blinking defective pixel can be prevented from occurring.

12 Claims, 12 Drawing Sheets

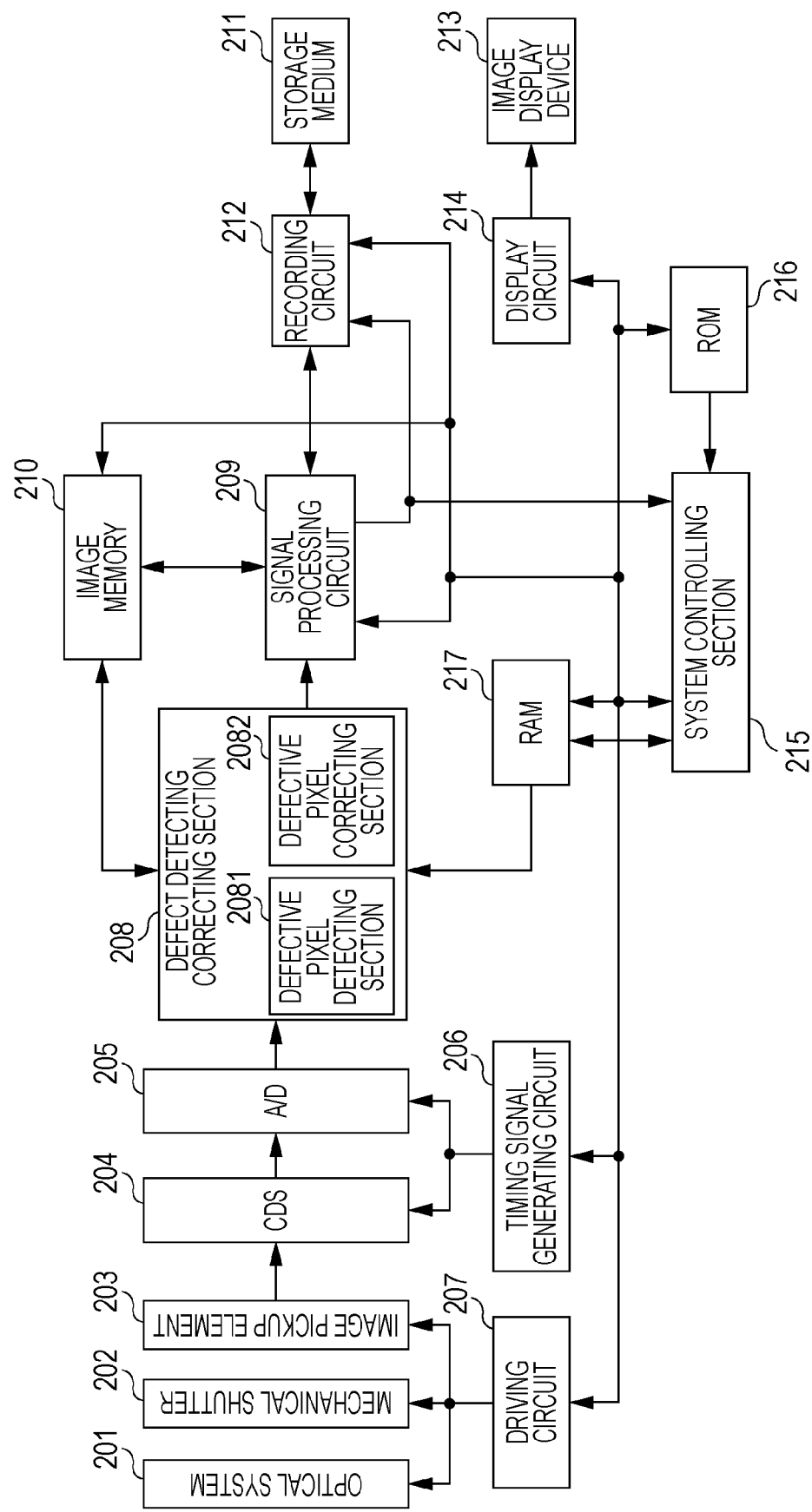

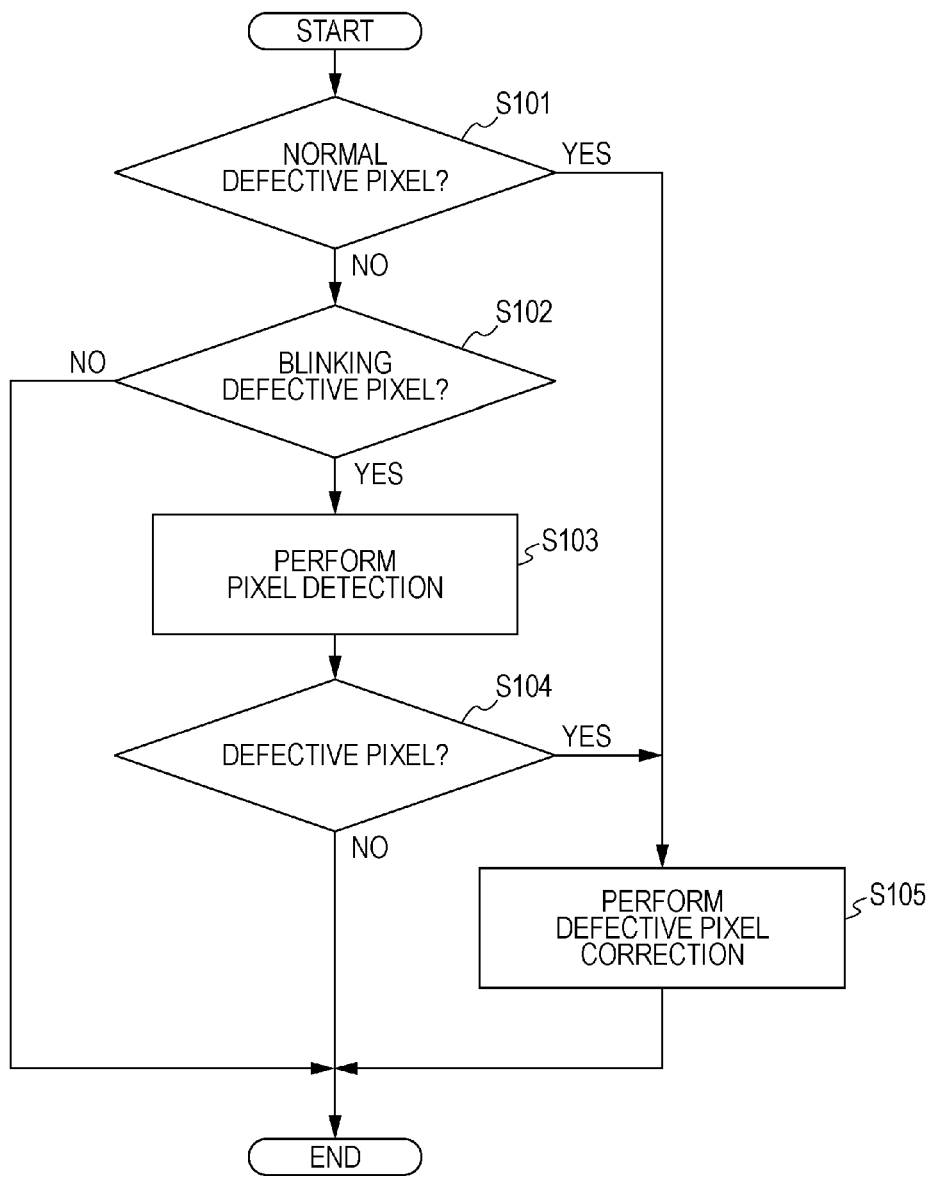

FIG. 3A

|   | x | x+1 | x+2 | x+3 | x+4 |
|---|---|---|---|---|---|
| y | R | G | R | G | R |
| y+1 | G | B | G | B | G |
| y+2 | R | G | R | G | R |
| y+3 | G | B | G | B | G |
| y+4 | R | G | R | G | R |

FIG. 3B

|   | x | x+1 | x+2 | x+3 | x+4 |
|---|---|---|---|---|---|
| y | R(40) | G | R(40) | G | R(40) |
| y+1 | G | B | G | B | G |
| y+2 | R(40) | G | R(255) | G | R(40) |
| y+3 | G | B | G | B | G |
| y+4 | R(40) | G | R(40) | G | R(40) |

FIG. 3C

|   | x | x+1 | x+2 | x+3 | x+4 |
|---|---|---|---|---|---|
| y | R(40) | G | R(100) | G | R(100) |
| y+1 | G | B | G | B | G |
| y+2 | R(100) | G | R(200) | G | R(100) |
| y+3 | G | B | G | B | G |
| y+4 | R(200) | G | R(100) | G | R(40) |

FIG. 3D

|   | x | x+1 | x+2 | x+3 | x+4 |
|---|---|---|---|---|---|
| y | R(40) | G | R(60) | G | R(40) |
| y+1 | G | B | G | B | G |
| y+2 | R(60) | G | R(200) | G | R(60) |
| y+3 | G | B | G | B | G |
| y+4 | R(40) | G | R(60) | G | R(40) |

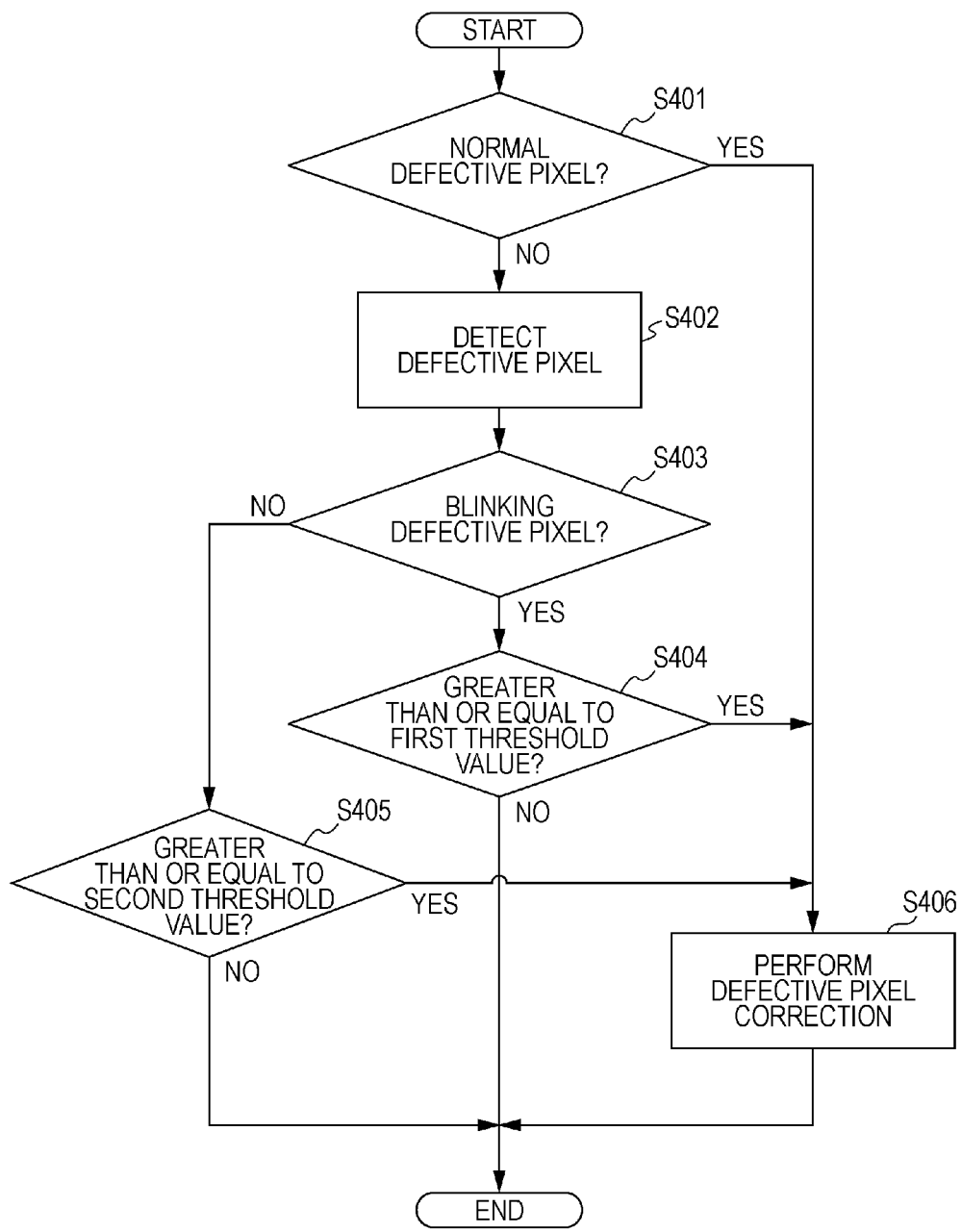

METHOD OF DETECTING DEFECT IN IMAGE PICKUP APPARATUS AND THE IMAGE PICKUP APPARATUS

TECHNICAL FIELD

The present invention relates to a technique of correcting a defective pixel in an image pickup element.

BACKGROUND ART

It is known that, in image pickup elements, such as CCD sensors and CMOS sensors, a localized sensitivity failure of a semiconductor may occur during a manufacturing process or after the manufacturing process. When such a sensitivity failure occurs, an electric charge output in accordance with an incident light quantity cannot be obtained from a pixel, as a result of which a white spot or a black spot that is unrelated to an object appears on an image pickup screen. Such a pixel that causes a white spot or a black spot unrelated to an object to be output is called a defective pixel. In order to correct image quality degradation caused by such a defective pixel by signal processing, the defective pixel is detected beforehand. First, when manufacturing an image pickup element at a semiconductor factory, any defective pixel in the manufactured image pickup element is detected, and position data of the detected defective pixel is stored in a nonvolatile memory.

Even after installing the image pickup element in an image pickup apparatus, any defective pixel in the image pickup element can be detected. For example, when a mechanical shutter of the image pickup apparatus is in a light-shielding state, a pixel (white-spot defective pixel) whose output level from the image pickup element exceeds a predetermined level is detected. Alternatively, when the shutter is opened, and the incident light quantity is set to a predetermined quantity, any pixel (black-spot defective pixel) at which an output level does not reach the predetermined level is detected. Position data of the detected white-spot defective pixel or the detected black-spot defective pixel is stored in the nonvolatile memory. Because position data of the above-described defective pixels can be stored prior to normal image pickup operation (prior to the imaging apparatus being used for actual imaging of an object), these defective pixels can be referred to as "steady defective pixels". During normal image pickup operation of the image pickup apparatus, an image signal obtained by imaging an object is corrected with signal processing by taking into account the defective pixels on the basis of the pre-stored position data.

In recent years, the probability with which defective pixels occurs tends to increase due to an increase in the number of pixels of image pickup elements. Further, formation of finer pixels resulting from the increase in the number of pixels of the image pickup elements has caused the recognition of new phenomena that have been hitherto overlooked. For instance, the existence of pixels whose signal levels are read increase or decrease considerably when pixel signals from the image pickup elements are repeatedly read out. Pixels that cause such a phenomena to occur are called blinking defective pixels. There are blinking defective pixels that depend upon temperature and storage time, and blinking defective pixels that do not depend upon temperature and storage time. Blinking defective pixels are variously mechanically generated.

Blinking defective pixels are normal pixels at certain times, and are white-spot defective pixels at other times, so that they act as though they are blinking white-spot defective pixels. Therefore, when a manufacturing process of an image pickup element is performed or when an image pickup apparatus performs a self-measurement operation, all of the blinking defective pixels cannot be detected by detecting each defective pixel once. In addition, the defective pixels are turned on during an actual image taking operation in which an image of a taken object is recorded, as a result of which the blinking defective pixels stand out, thereby degrading the taken image.

In view of such a situation, Japanese Patent Laid-Open No. 2003-37781 discloses a technology in which, on the basis of a plurality of image signals obtained under the same condition, defective pixel addresses of an image pickup element are detected, and the pixel addresses where the number of times by which defects are determined is greater than a predetermined number of times are detected as final defective pixel addresses.

CITATION LIST

Patent Literature

PTL 1 Japanese Patent Laid-Open No. 2003-37781

However, in the above-described related art, even if blinking defective pixels are not turned on during the actual taking operation and normal image signals are output, the normal image signals are corrected as defective pixels, thereby degrading image quality of a taken image.

SUMMARY OF INVENTION

It is an object of the present invention to provide a defective pixel detecting device which, when an image signal indicating a defective pixel is output from a blinking defective pixel, the blinking defective pixel is detected as a defective pixel, and which, when a normal image signal is output from a blinking defective pixel, the blinking defective pixel is detected as a normal pixel.

To this end, the present invention provides an image pickup apparatus comprising an image pickup element that performs photoelectric conversion on incident light from an object; correcting means that corrects an output signal value of a blinking defective pixel using an output signal value of a surrounding pixel, the blinking defective pixel unsteadily outputting a signal of an abnormal value in the image pickup element; determining means that determines whether or not the output signal value of the blinking defective pixel is the abnormal value by smoothening the output signal value of the blinking defective pixel and the output signal value of the surrounding pixel, by calculating an absolute value of a difference between the output signal value of the blinking defective pixel and a result of the smoothening as a value indicating a degree of defect of the blinking defective pixel, and by comparing the value indicating the degree of defect with a predetermined threshold value; and controlling means that performs control so that the output signal value of the blinking defective pixel is corrected by the correcting means when the determining means determines that the output signal value of the blinking defective pixel is the abnormal value, and that performs the control so that the output signal value of the blinking defective pixel is not corrected by the correcting means when the determining means determines that the output signal value of the blinking defective pixel is not the abnormal value.

The present invention also provides a defective pixel correction method of an image pickup apparatus including an image pickup element that performs photoelectric conversion on incident light from an object, the method comprising a correcting step of correcting an output signal value of a blinking defective pixel using an output signal value of a surrounding pixel, the blinking defective pixel unsteadily outputting a signal of an abnormal value in the image pickup element; and a controlling step in which the output signal value of the blinking defective pixel and the output signal value of the surrounding pixel are smoothened, an absolute value of a difference between the output signal value of the blinking defective pixel and a result of the smoothening is calculated as a value indicating a degree of defect of the blinking defective pixel, and the value indicating the degree of defect is compared with a predetermined threshold value, so that control is performed such that the output signal value of the blinking defective pixel is corrected in the correcting step when it is determined that the output signal value of the blinking defective pixel is the abnormal value in determining whether or not the output signal value of the blinking defective pixel is the abnormal value, and so that the control is performed such that the output signal value of the blinking defective pixel is not corrected in the correcting step when it is determined that the output signal value of the blinking defective pixel is not the abnormal value in determining whether or not the output signal value of the blinking defective pixel is the abnormal value.

Further features of the present invention will become apparent to persons having ordinary skill in the art from the following description of exemplary embodiments with reference to the attached drawings.

BRIEF DESCRIPTION OF DRAWINGS

FIG. 1 is a block diagram for illustrating an image pickup apparatus.

FIG. 2 is a flowchart for illustrating a detection operation of a blinking defective pixel in a first embodiment.

FIGS. 3A to 3D show exemplary pixel arrangements of an image pickup element and exemplary output signals.

FIG. 4 is a flowchart for illustrating a detection operation of a blinking defective pixel in a second embodiment.

DESCRIPTION OF EMBODIMENTS

First Embodiment

Figure 5:
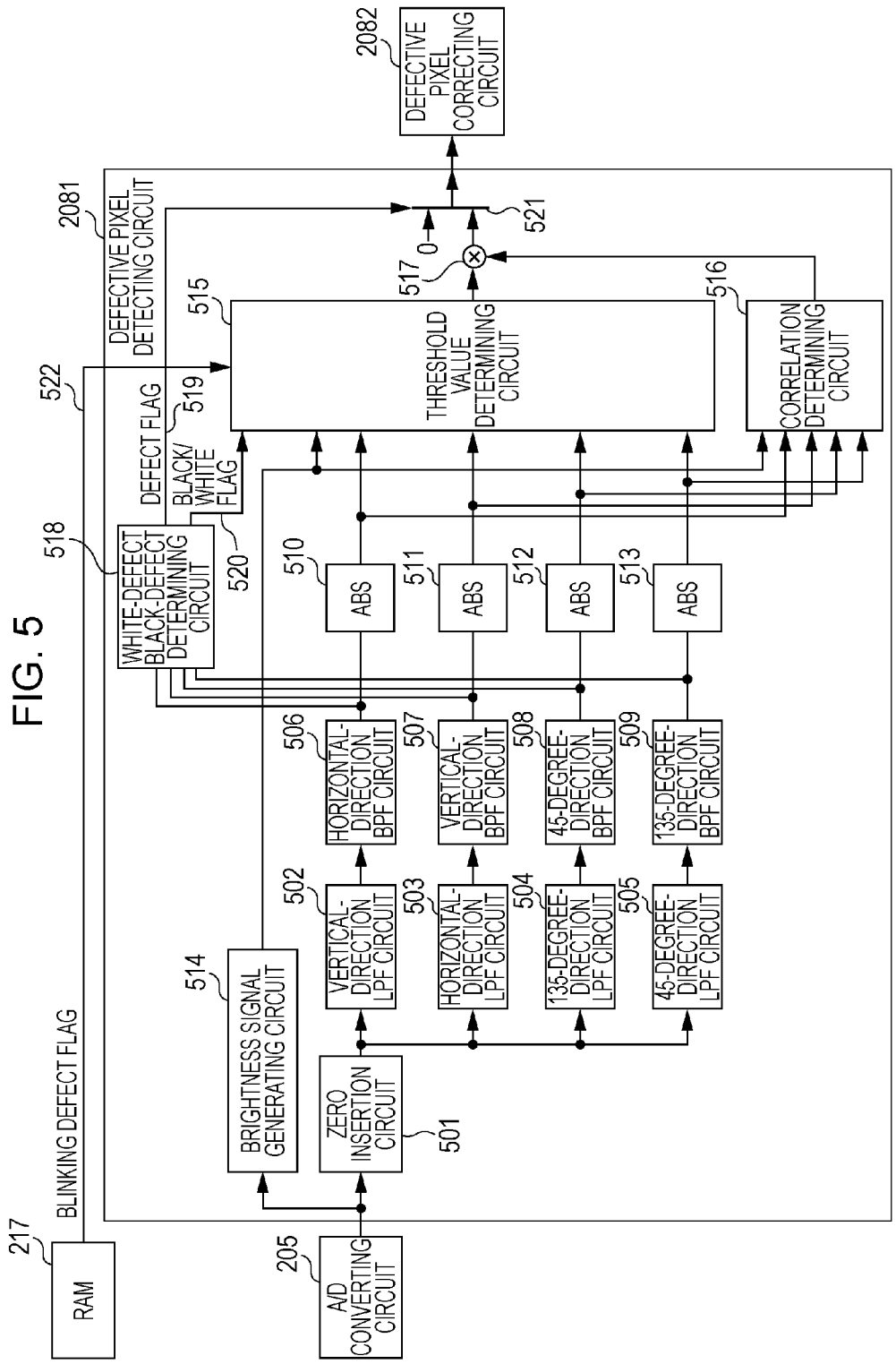
FIG. 5 is a block diagram for illustrating a defective pixel detecting section in a third embodiment.

FIG. 1 is a block diagram of an image pickup apparatus including a defective pixel correcting device in a first embodiment of the present invention. In FIG. 1, an object image incident upon the image pickup apparatus through an optical system 201, including a lens and an aperture stop, and a mechanical shutter 202 is subjected to photoelectric conversion by an image pickup element 203 such as a CCD sensor or a CMOS sensor. An analog signal output from the image pickup element 203 is subjected to a low-frequency noise removal operation by a CDS (correlated double sampling) circuit 204, and is converted into a digital signal by an A/D converting circuit 205.

The optical system 201, the mechanical shutter 202, and the image pickup element 203 are driven by a driving circuit 207. A timing signal generating circuit 206 generates a timing signal for driving the CDS circuit 204 and the A/D converting circuit 205. The digital signal converted by the A/D converting circuit 205 is input to a defective pixel detecting correcting section 208. The defective pixel detecting correcting section 208 includes a defective pixel detecting section 2081 (determining means or determining unit), which detects a defective pixel, and a defective pixel correcting section 2082 (correcting means or correcting unit), which performs a defective pixel correction operation by interpolating a signal value output from the defective pixel using a signal value output from a pixel near the defective pixel.

An image signal output from the defective pixel detecting correcting section 208 is input to a signal processing circuit 209. The signal processing circuit 209 performs on the input image signal processing operations of an image pickup system, such as color separation, aperture correction, gamma correction, and a white balance operation. Here, a digital image signal subjected to the signal processing by the signal processing circuit 209 is temporarily stored in an image memory 210.

Image data subjected to the signal processing by the signal processing circuit 209 is recorded in a recording medium 211 by a recording circuit 212. The recording medium 211 is, for example, a memory card removably mounted to the image pickup apparatus. The image data subjected to the signal processing by the signal processing circuit 209 is displayed on an image display device 213 by a display circuit 214.

A system controlling section 215 (controlling means or control unit), formed by, for example, a CPU, controls the entire image pickup apparatus. ROM 216 stores, for example, a program in which a control method executed by the system controlling section 215 is written; control data of, for example, a table or a parameter used when executing the program; and addresses of normal defective pixels (non-blinking defective pixels) and blinking defective pixels. ROM 216 transfers to RAM 217 (storage means or storage unit), for example, the program, the control data, and address data of normal defective pixels and blinking defective pixels, stored in ROM 216 (storage means), in order to temporarily store them in RAM 217.

Although, in the embodiment, the address data of normal defective pixels and blinking defective pixels stored in ROM 216 provides an address corresponding to each image pickup element checked in a manufacturing process of each image pickup element 203, the present invention is not limited thereto. For example, after installing the image pickup element 203 in the image pickup apparatus, information regarding a new defective pixel may be provided by the defective pixel detecting section 2081 and stored in ROM 216.

Next, the flow of operations in the defect detecting correcting section 208 in the embodiment will be described with reference to the flowchart of FIG. 2. In the flowchart of FIG. 2, the system controlling section 215 executes the process steps by controlling each portion of the image pickup apparatus by referring to, for example, the control program, the control data, and the address data of normal defective pixels and blinking defective pixels, transferred to RAM 217 from ROM 216 and temporarily stored in RAM 217.

In Step S101, the defective pixel detecting section 2081 of the defective pixel detecting correcting section 208 refers to information of addresses of normal defective pixels temporarily stored in RAM 217, and determines whether or not each pixel of a digital signal input from the A/D converting circuit 205 is a normal defective pixel.

More specifically, in Step S101, when it is determined that a target pixel of the input digital signal is a normal defective pixel (YES in S101), the process proceeds to Step S105. In step S105, a defective pixel correction operation is performed by the defective pixel correcting section 2082, and processed image data is output to the signal processing circuit 209. When, in Step S101, it is determined that the target pixel of the input digital signal is not a normal defective pixel (NO in S101), the process proceeds to Step S102.

In Step S102, the defective pixel detecting section 2081 refers to the information of the addresses of the blinking defective pixels temporarily stored in RAM 17, and determines whether or not the target pixel of the input digital signal is a blinking defective pixel. If, in Step S102, it is determined that the target pixel of the input digital signal is a blinking defective pixel (YES in S102), the process proceeds to Step S103. If, in Step S102, it is determined that the target pixel of the input digital signal is not a blinking defective pixel (NO in S102), a value of the input pixel is output unchanged to the signal processing circuit 209 and the process ends without performing a defective pixel correction operation by the defective pixel correcting section 2082.

In Step S103, the defective pixel correcting section 2082 performs a defective pixel detection operation, to calculate a degree of defect of the defective pixel, and the process proceeds to Step S104. In Step S104, a value indicating the degree of defect obtained by the defective pixel detection operation in Step S103 is compared with a threshold value that is set to any value, to determine whether or not a value of the input pixel signal is an abnormal value. The threshold value will be discussed later.

If, in Step S104, it is determined that the value of the input pixel signal is an abnormal value (YES in S104), the pixel is assumed to be behaving like a defective pixel, and the process proceeds to Step S105. In Step S105, the defective pixel correcting section 2082 performs a defective pixel correction operation, and processed image data is output to the signal processing circuit 209 to end the process. If, in Step S104, it is determined that the value of the input pixel signal is not an abnormal value (NO in S104), it is assumed that a normal pixel signal is being output, as a result of which the defective pixel correcting section 2082 does not perform a defective pixel correction operation. Then, the value of the input pixel is output as it is (unchanged) to the signal processing circuit 209, to end the process.

Next, the defective pixel detection operation (calculation of a value indicating the degree of defect) performed by the defective pixel detecting section 2081 in Step S103 in FIG. 2 will be described with reference to FIG. 3A. Here, although a defective pixel detection method using a median filter is indicated as an example, the present invention is not limited thereto. Modifications can be made to the defective pixel detection operation as appropriate without departing from the gist of the present invention.

First, if, in Step S102 in FIG. 2, it is determined that the target pixel of the input digital signal is a blinking defective pixel, a median filter operation is executed on data of the input target pixel and data of pixels surrounding the input pixel. Pixels surrounding the input pixel can be the pixels immediately adjacent to the input pixel and those extending to a predetermined radius thereof, or "surrounding" pixels may be determined, for example, based on the type of application. In the median filter operation that is executed here, for example, a center value of data of an image having the same color in a range of 5×5 pixels in the horizontal and vertical direction with respect to the input target pixel (for example, R(x+2, y+2) is extracted, to replace the value of the target pixel with the extracted center value. If the target pixel is positioned at or near an edge (for example, near one of the corners) of the image pickup element 3, and the range of 5×5 pixels in the horizontal and vertical direction cannot be provided, the median filter operation is performed on a maximum range in which the target pixel is at the center (such as a range of 3×3 pixels in the horizontal and vertical direction). The median filter operation executed on data of the input target pixel and data of pixels surrounding the input pixel is not limited to the above example. Indeed, instead of using a center value of data of an image having the same color in a predetermined range, a value of data of an image having the same illuminance, brightness, wavelength or the like can be used.

The address data of normal defective pixels temporarily stored in RAM 217 is referred to, to determine whether or not any normal defective pixel exists within the range in which the median filter operation is performed. If it is determined that a normal defective pixel exists within a processing range, the median filter operation is performed using the data of pixels other than the normal defective pixels that are not subject to calculation. For example, in FIG. 3A, if the target pixel is R(x+2, y+2), the center value of a R pixel that receives light within the range of 5×5 pixels in the horizontal and vertical direction from R(x, y) at the upper left to R(x+4, y+4) at the lower right is determined. Here, if, for example, R(x+4, y+4) is extracted as a defective pixel, the median filter operation is performed using the data of pixels other than R(x+4, y). Similarly to the R pixel, median filter operations within the range of 5×5 pixels in the horizontal and vertical direction are performed on R and B pixels, respectively.

Next, the pixel data subjected to the median filter operations is subtracted from original pixel data, and a value obtained from the subtraction is output as a value indicating the degree of defect. Here, the value resulting from the median filter operation correspond to image data smoothed by eliminating the influence of defective pixels and removing high-frequency components. Therefore, when an absolute value of the difference between the smoothed pixel data and the original pixel data is determined, a prominent value of the blinking defective pixel and the high-frequency components are obtained.

In the defective pixel detection operation, the absolute value of the difference and the threshold value are compared to determine whether or not the pixel is a defective pixel. Here, using FIGS. 3B and 3C, a case in which a blinking defective pixel is behaving like a defective pixel, and a case in which a high-frequency component exists at a blinking defective pixel will be described. FIG. 3B shows input data when a blinking defective pixel is behaving like a defective pixel, with an R(x+2, y+2) pixel at the center being a blinking defective pixel. Here, a value (255) in parentheses is an output signal level. By performing the median filter operation on the R(x+2, y+2) pixel, a center value of image data within the range of 5×5 pixels in the horizontal and vertical direction from R(x, y) at the upper left to R(x+4, y+4) at the lower right is calculated:

$$\text{median}(R(x,y){\sim}R(x+4,y+4))=40 \tag{1}$$

Next, when the absolute value of the difference between the original pixel data and the image data subjected to the median filter operation is determined, the value indicating the degree of defect is calculated:

$$abs(R(x+2,y+2){\sim}\text{median}(R(x,y){\sim}R(x+4,y+4)))=\\abs(255-40)=215 \tag{2}$$

The calculation result of Formula 2 corresponds to an output obtained from the defective pixel detecting section 2081 in Step S103 in FIG. 2 when a blinking defective pixel is behaving like a defective pixel.

FIG. 3C shows input data when a high-frequency component exists at a blinking defective pixel, with an R(x+2, y+2) pixel at the center being a blinking defective pixel. When the median filter operation is performed on the R(x+2, y+2) pixel, a center value of image data within the range of 5×5 pixels in the horizontal and vertical direction from R(x, y) at the upper left to R(x+4, y+4) at the lower right is calculated:

$$\text{median}(R(x,y) \sim R(x+4, y+4)) = 100 \quad (3)$$

Next, when the absolute value of the difference between the original pixel data and the image data subjected to the median filter operation is determined, the value indicating the degree of defect is calculated:

$$\text{abs}(R(x+2, y+2) - \text{median}(R(x,y) \sim R(x+4, y+4))) = \text{abs}(200-100) = 100 \quad (4)$$

The calculation result of Formula 4 corresponds to an output obtained from the defective pixel detecting section 2081 in Step S103 in FIG. 2 when a high-frequency component exists at a blinking defective pixel.

The threshold value used in Step S104 of FIG. 2 is arbitrarily set considering a component resulting from the blinking defective pixel included in the output value resulting from determining the absolute value of the difference (output value of Formula 2) and a component resulting from the high-frequency component (output value of Formula 3). In the examples shown in FIGS. 3B and 3C, the output resulting from a defect in FIG. 3B is considered as indicating a defect, and the output resulting from the high-frequency component in FIG. 3C is a value not indicating a defect (for example, values greater than or equal to 100 to less than 215 in Formulas 2 and 4).

Even if a defective pixel detection method differing from the defective pixel detection method using a median filter discussed in the embodiment is used, it is difficult to completely separate the output resulting from the defect and the output resulting from the high-frequency component. Therefore, the threshold value needs to be set at a level at which a defect is not detected with respect to a high-frequency component at, for example, an edge having an amplitude that is relatively smaller than that at a blinking defective pixel.

Accordingly, in the embodiment, it is determined whether or not an output value is an abnormal value for every pixel that has previously been determined as being a blinking defective pixel. Even if a pixel is determined as being a blinking defective pixel, when its output value is not an abnormal value, reproducibility of an image can be increased by leaving an original normal output value.

Second Embodiment

In the first embodiment, defect detection is performed on a blinking defective pixel detected in the manufacturing process of the image pickup element. Among blinking defective pixels, some become blinking defective pixels after performing detection in a manufacturing process of the image pickup element, and some are not detected in the manufacturing process since their blinking periods are long. Accordingly, in the second embodiment, even for normal defective pixels and undetected defective pixels that are not detected as blinking defective pixels in the manufacturing process, detection operations are performed to determine whether or not the pixels are defective pixels with respect to signals output from the image pickup element for respective shooting operations. Similarly to the first embodiment, detection is performed on the blinking defective pixels detected in the manufacturing process of the image pickup element to determine again whether or not the blinking defective pixels are defective pixels. In the detection, threshold values used in performing defective pixel detection on blinking defective pixels detected in the manufacturing process and pixels that are not detected as normal defective pixels or blinking defective pixels are provided. Here, the threshold value used in performing the defective pixel detection on the blinking defective pixels is a first threshold value, and the threshold value used in the defective pixel detection on the undetected defective pixels is a second threshold value.

The flow of operations at the defect detecting correcting section 208 in the second embodiment will be described with reference to the flowchart of FIG. 4. The flowchart of FIG. 4 is executed by the system controlling section 215 controlling each portion by referring to the control program, the control data, and the data of the addresses of normal defective pixels and blinking defective pixels, which are transferred to RAM 217 from ROM 216 and temporarily stored in RAM 217.

In Step S401, the defective pixel detecting section 2081 of the defective pixel detecting correcting section 208 refers to the address information of normal defective pixels temporarily stored in RAM 217, and determines whether or not pixels of digital signals input from the A/D converting circuit 205 are normal defective pixels.

If, in Step S401, it is determined that a target pixel of the input digital signal is a normal defective pixel, the process proceeds to Step S406 in which the defective pixel correcting section 2082 performs a defective pixel correction operation, to output processed image data to the signal processing circuit 209. If, in Step S401, it is determined that the target pixel of the input digital signal is not a normal defective pixel, the process proceeds to Step S402.

In Step S402, the defective pixel detecting section 2081 performs a defective pixel detection operation with respect to the target pixel of the input digital signal, and calculates a value indicating the degree of defect, after which the process proceeds to Step S403. A defective pixel detection result (result of calculation of the value indicating the degree of defect) is temporarily stored in RAM 217, and is referred to in a later step.

In Step S403, the defective pixel detecting section 2081 refers to the information of the addresses of the blinking defective pixels temporarily stored in RAM 217, and determines whether or not the target pixel of the input digital signal is a blinking defective pixel. If, in Step S403, it is determined that the target pixel of the input digital signal is a blinking defective pixel, the process proceeds to Step S404. If, in Step S403, it is determined that the target pixel of the input digital signal is not a blinking defective pixel, the process proceeds to Step S405.

In Step S404, for the target pixel determined as being a blinking defective pixel in Step S403, it is determined whether or not the value indicating the degree of defect calculated in Step S402 is greater than or equal to the first threshold value. That is, it is determined whether or not the blinking defective pixel is behaving like a defective pixel. If, in Step 404, it is determined that the value indicating the degree of defect of the target pixel is greater than or equal to the first threshold value, the target pixel is assumed as behaving like a defective pixel, and the process proceeds to Step S406. In Step S406, the defective pixel correcting section 2082 performs a defective pixel correction operation, and outputs processed image data to the signal processing circuit 209 to end the process. If, in Step S404, the value indicating the degree of defect of the target pixel is less than the first threshold value, it is assumed that a normal pixel signal is output, as a result of which the defective pixel correcting section 2082 does not perform a defective pixel correction operation. Then, the value of the input pixel is output as it is to the signal processing circuit 209 to end the process.

In Step S405, for the target pixel that is not determined as being a blinking defective pixel in Step S403, it is determined whether or not the value indicating the degree of defect calculated in Step S402 is greater than or equal to the second threshold value. If, in Step S405, it is determined that the value indicating the degree of defect of the target pixel is greater than or equal to the second threshold value, the target pixel is assumed as being an undetected defective pixel, and the process proceeds to Step S406. In Step S406, the defective pixel correcting section 2082 performs a defective pixel correction operation, and processed image data is output to the signal processing circuit 209 to end the process. If, in Step S405, it is determined that the value indicating the degree of defect of the target pixel is less than the second threshold value, it is assumed that a normal pixel signal is output, as a result of which the defective pixel correcting section 2082 does not perform a defective pixel correction operation. Then, the value of the input pixel is output as it is to the signal processing circuit 209, to end the process.

Here, as with the threshold value used in the first embodiment, the first threshold value needs to be set at a level at which an output resulting from a high-frequency component at, for example, an edge having an amplitude that is relatively smaller than that at a blinking defective pixel is not detected as a defect. In addition, it is necessary that the second threshold value used in defective pixel detection of an undetected defective pixel be set at a value at which the pixel is relatively less frequently determined as being a defective pixel compared to when the first threshold value is used. This is because pixels where detects are not detected in a manufacturing process that are dominant in number compared to the number of pixels in the image pickup element have a very bad effect on image quality, resulting from erroneous detection of defects, with respect to pixels that are previously detected as blinking defective pixels in the manufacturing process.

Accordingly, the second threshold value is a value at which an object, similar to a blinking defective pixel resembling a point light source (such as lights of a building or a star that may become an object when a night scene is photographed), is not determined as being a defective pixel. An exemplary defective pixel detection operation using a median filter when an object having the form of a point light source resembling a blinking defective pixel will be described with reference to FIG. 3D.

FIG. 3D shows input data when an object having the form of a point light source resembling a blinking defective pixel exists, with a R(x+2, y+2) pixel at the center being a detection target pixel. Here, a value (200) in parentheses is an output signal level. By performing a median filter operation on the R(x+2, y+2) pixel, a center value of image data within the range of 5×5 pixels in the horizontal and vertical direction from R (x, y) at the upper left to R(x+4, y+4) at the lower right is calculated:

$$\text{median}(R(x,y) \sim R(x+4,y+4)) = 60 \quad (5)$$

Next, when the absolute value of the difference between original pixel data and the image data subjected to the median filter operation is determined, a value indicating the degree of defect is calculated:

$$abs(R(x+2,y+2) - \text{median}(R(x,y) \sim R(x+4,y+4))) = abs(200-60) = 140 \quad (6)$$

The calculation result of Formula 6 corresponds to an output value obtained from the defective pixel detecting section 2081 in Step S402 in FIG. 4 when an object having the form of a point light source resembling a blinking defective pixel exists. It can be understood that the calculation result of Formula 6 when an object having the form of a point light source exists has a value that is greater than that of the calculation result of Formula 4 when a high-frequency component exists. In addition, this value of the calculation result of Formula 6 is one at which the target pixel tends to be erroneously determined as being a defective pixel.

Accordingly, for the previous examples shown in FIGS. 3B and 3D, the second threshold value is set to a value at which the output of a defective pixel in FIG. 3B is considered as a defect, and a component of an object, such as a point light source resembling a blinking defect pixel in FIG. 3D, is not considered as a defect. In addition, the second threshold value is relatively larger than the first threshold value (the second threshold value is greater than or equal to 140 to less than 215 in Formulas 2 and 6, differs from the first threshold value, and is greater than the first threshold value).

Accordingly, when the second threshold value is determined considering an object resembling a defective pixel, it is possible to minimize adverse influences resulting from erroneous detection, and to detect a defective pixel having a large amplitude that considerably adversely affects image quality. Further, considering correction precision of the defective pixel correction method performed by the defective pixel correcting section 2082, the second threshold value is set to any value that can minimize any adverse effect on image quality on the basis of the amplitude of a defective pixel to be detected and the degree of signal degradation resulting from the defective pixel correction with respect to the erroneously detected pixel. Such a setting makes it possible to obtain an optimal output image.

Although, in the embodiment, the threshold value used in the defective pixel detection is changed depending upon whether or not an object to be detected is a blinking defective pixel or an undetected defective pixel, the present invention is not limited thereto. For example, when a pixel is an undetected defective pixel with respect to a value output by the defective pixel detecting section 2081, for example, gain that is greater than or equal to 1 may be provided to make it relatively easier to determine an occurrence of a defect with respect to the blinking defective pixel.

In the embodiment, as in the first embodiment, for pixels that are previously determined as being blinking defective pixels, it is determined whether or not an output value of each target pixel is abnormal. This makes it possible to leave any normal output value to the extent possible when the output value of any target pixel is not an abnormal value. Further, when defective pixel detection is performed on a pixel that has become a defective pixel after performing defective pixel detection in a manufacturing process, it is also possible to detect a newly generated defective pixel. Further, if the threshold value for detection used when defect detection is performed again on any blinking defective pixel detected in the manufacturing process differs from that when defect detection is performed again on any defective pixel generated after it is detected in the manufacturing process, it is possible to perform an operation in which adverse effects on a taken image are reduced.

Third Embodiment

In a third embodiment, an exemplary form in which a defective pixel detection method differing from that in the second embodiment will be described. In the embodiment, the structure of the defective pixel detecting section 2081 differs. The other structural features are basically the same as those in the second embodiment. According to the defective pixel detection method of the embodiment, edge or noise and a defective pixel are distinguished from each other by extracting a signal of a desired spatial frequency bandwidth. FIG. 5 shows the structure of the defective pixel detecting section 2081 according to the third embodiment. The structure will hereunder be described in detail with reference to FIG. 5. In the embodiment, the case in which a blinking defect generated at a G pixel is detected will be taken as an example to describe the embodiment.

Figure 6:
FIGS. 6A to 6I illustrate a filtering method in the third embodiment.

In FIG. 5, digital image data is input to the defective pixel detecting section 2081 from an A/D converting circuit 205. First, in a zero insertion circuit 501, zero values are inserted in pixels other than G pixels of the input image data as shown in FIG. 6A.

Next, in a vertical-direction low-pass filter (hereunder abbreviated as "LPF") circuit 502, a LPF operation having a filter coefficient with respect to, for example, a vertical direction of image data (1, 2, 1) is performed. By the vertical-direction LPF operation, as shown in FIG. 6B, the pixels having zero values are interpolated from pixels in the vertical direction, and the pixels above and below the defective pixel are interpolated using defective pixel data. Similarly, in a horizontal-direction LPF circuit 503, a LPF operation is performed with respect to a horizontal direction of the image data. By the horizontal-direction LPF operation, as shown in FIG. 6C, the pixels having zero values are interpolated from pixels in the horizontal direction, and the pixels on the left and right of the defective pixel are interpolated using the defective pixel data.

In addition, in a 135-degree-direction LPF circuit 504, a LPF operation is performed with respect to a 135-degree direction of the image data. By the 135-degree-direction LPF operation, as shown in FIG. 6D, the pixels having zero values are interpolated from pixels in the 135-degree direction, and the pixels adjacent to the defective pixel in the 135-degree direction are interpolated using defective pixel data. Further, in a 45-degree-direction LPF circuit 505, a LPF operation is performed with respect to a 45-degree direction of the image data. By the 45-degree-direction LPF operation, as shown in FIG. 6E, the pixels having zero values are interpolated from pixels in the 45-degree direction, and the pixels adjacent to the defective pixel in the 45-degree direction are interpolated using the defective pixel data.

Subsequently, in a horizontal-direction band-pass filter (hereunder abbreviated as "BPF") circuit 506 that cuts off a direct-current component, a BPF operation having a filter coefficient with respect to, for example, a horizontal direction of output data (−1, 0, 2, 0, −1)) of the vertical-direction LPF circuit 502 is performed. Since, as shown in FIG. 6F, the BPF operation is performed in a direction orthogonal to the LPF operation, the pixels interpolated using the defective pixel data are not referred to. Similarly, in a vertical-direction BPF circuit 507 that cuts off a direct-current component, a BPF operation is performed with respect to a vertical direction of the output data of the horizontal-direction LPF circuit 503. The direction of the BPF operation is illustrated in FIG. 6G.

In a 45-degree-direction BPF circuit 508, a BPF operation is performed with respect to a 45-degree direction of output data of the 135-degree-direction LPF circuit 504. The direction of the BPF operation is illustrated in FIG. 6H. Further, in a 135-degree-direction BPF circuit 509, a BPF operation is performed with respect to a 135-degree direction of output data of the 45-degree-direction LPF circuit 505. The direction of the BPF operation is illustrated in FIG. 6I.

An ABS (absolute value) circuit 510 outputs an absolute value of output data of the horizontal-direction BPF circuit 506. An ABS circuit 511 outputs an absolute value of output data of the vertical-direction BPF circuit 507. An ABS circuit 512 outputs an absolute value of output data of the 45-degree-direction BPF circuit 508. An ABS circuit 513 outputs an absolute value of output data of the 135-degree-direction BPF circuit 509.

In addition, the digital image data output from the A/D converting circuit 205 is input to a brightness signal generating circuit 514. The brightness signal generating circuit 514 generates a brightness signal Y from image data formed of a R, G, and B Bayer pattern, on the basis of the following Formula 7:

$$Y = 0.299R + 0.587G + 0.114B \qquad (7)$$

The outputs of the horizontal-direction BPF circuit 506, the vertical-direction BPF circuit 507, the 45-degree-direction BPF circuit 508, and the 135-degree-direction BPF circuit 509 are input to a white-defect black-defect determining circuit 518. The white-defect black-defect determining circuit 518 refers to a sign that is either positive or negative, and outputs a defect flag 519 (1 bit) indicating whether or not a defect is formed and a black/white flag 520 (1 bit) for distinguishing between a white defect (white-spot defective pixel) and a black defect (black-spot defective pixel).

If all the BPF operation results have the same sign, the defect flag 519 becomes 1, and if any one of the BPF operation results differs, the defect flag 519 becomes 0. When the defect flag 519 is 0, the target pixel is not a defective pixel, whereas, when the defect flag 519 is 1, the target pixel is a defective pixel. The white-defect black-defect determining circuit 518 supplies the defect flag 519 to a selector 521. The selector 521 is such that the supplied defect flag 519 operates as a selection signal.

If all of the BPF operation results have positive signs, a black/white flag 520 becomes 1 indicating that the target pixel corresponds to a white defect, whereas, if all of the BPF operation results have negative signs, the black/white flag 520 becomes 0 indicating that the target pixel corresponds to a black defect. The white-defect black-defect determining circuit 518 supplies the black/white flag 520 to a threshold-value determining circuit 515. In the threshold-value determining circuit 515, it is determined whether or not the target pixel is a defective pixel by comparing absolute values of the BPF operation results in four direction input from the ABS circuits 510 to 513 with an arbitrarily set threshold value (the first threshold value or the second threshold value).

Figure 7:
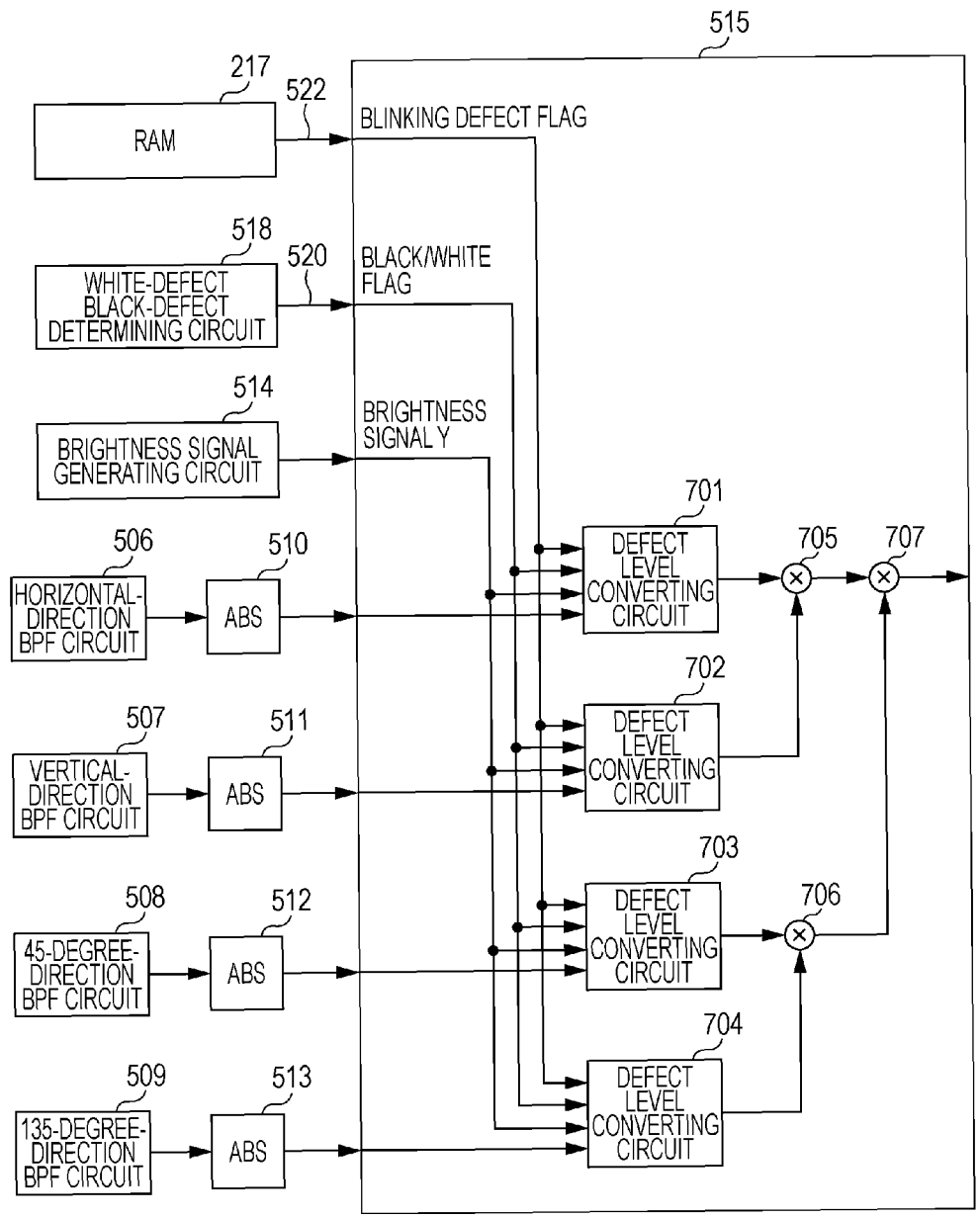
FIG. 7 is a block diagram for illustrating a threshold-value determining circuit in the third embodiment.

Here, the threshold-value determining circuit 515 will be described with reference to FIG. 7. A defect level converting circuit 701 refers to the absolute value of the horizontal-direction BPF operation result input from the ABS circuit 510, and calculates a defect level. A defect level converting circuit 702 refers to the absolute value of the vertical-direction BPF operation result input from the ABS circuit 511, and similarly calculates a defect level. A defect level converting circuit 703 refers to the absolute value of the 45-degree-direction BPF operation result input from the ABS circuit 512, and similarly calculates a defect level. A defect level converting circuit 704 refers to the absolute value of the 135-angle-direction BPF operation result input from the ABS circuit 513, and similarly calculates a defect level.

FIGS. 8A to 8D schematically illustrate operations of the defect level converting circuits 701 to 704. The horizontal axis in these figures represents the absolute value after the BPF operation input to each of the defect level converting circuits 701 to 704 from each of the corresponding ABS circuits 510 to 513 (that is, a value indicating the degree of defect). The vertical axis represents the output of each of the defect level converting circuits 701 to 704 (8 bits), and indicates a defective-pixel defect level (defect level). If the defect level is 0, a target pixel is not a defective pixel, whereas, if the defect level is 255, the target pixel is a defective pixel. A defect level that is greater than 0 and less than 255 refers to a pixel that cannot be easily distinguished from a normal pixel and a defective pixel.

Figure 8A:
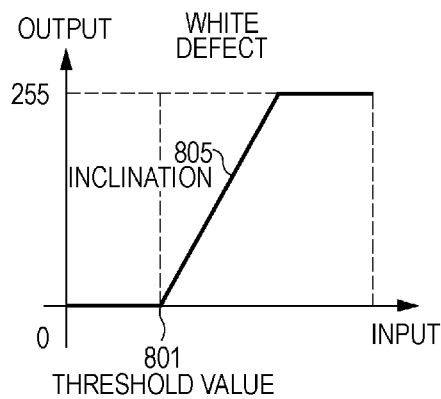
FIGS. 8A to 8D illustrate a defect level converting circuit in the threshold-value determining circuit in the third embodiment.
Figure 8B:
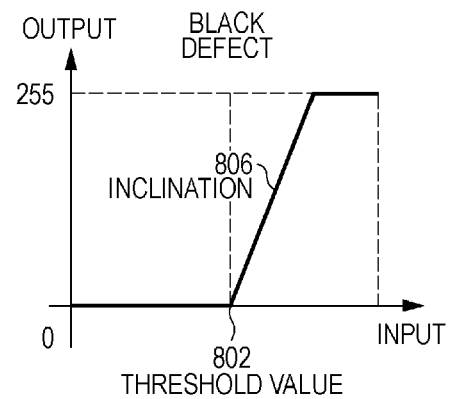

Threshold values 801 and 802 respectively shown in FIGS. 8A and 8B are threshold values for determining whether or not a pixel being processed is a blinking defective pixel by referring to the address data of blinking defective pixels read into RAM 217. The setting of the threshold value when the defect is a white defect can be performed separately from the setting of the threshold value when the defect is a black defect by referring to the black/white flag 520 input from the white-defect black-defect determining circuit 518. This is because differences in the characteristics of a white defect and those of a black defect depend upon varying operation of the threshold value on the basis of the brightness signal (described later).

Figure 8C:
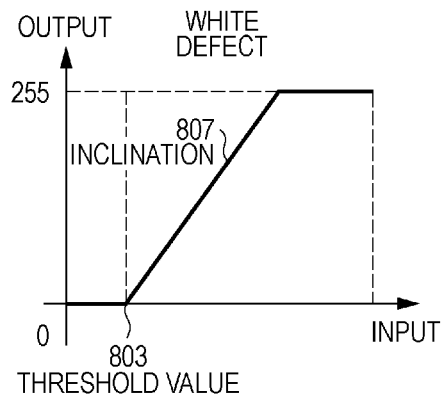
Figure 8D:
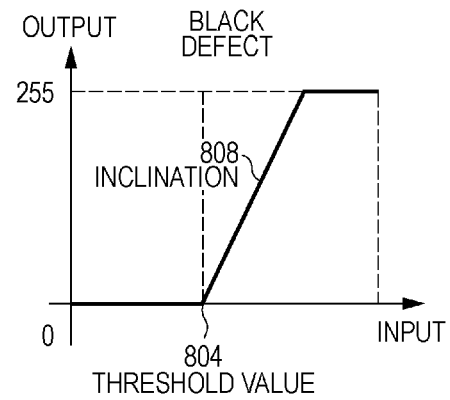

Threshold values 803 and 804 respectively shown in FIGS. 8C and 8D are threshold values for determining whether or not a pixel being processed is an undetected blinking defective pixel. An undetected blinking defective pixel can be determined on the basis of a BLINKING DEFFECT FLAG 522 stored in RAM 217 by referring to the address data of blinking defective pixels read into RAM 217. Similarly, the setting of the threshold value when a defect is a white defect can be performed separately from the setting of the threshold value when the defect is a black defect. Input/output relationships shown in FIGS. 8A and 8B are applied to a case in which a pixel is a blinking defective pixel. The threshold value 801 is the first threshold value when a defect is a white defect, and the threshold value 802 is the first threshold value when the defect is a black defect. Input/output relationships shown in FIGS. 8C and 8D are applied to a case in which a pixel is an undetected defective pixel. The threshold value 803 is the second threshold value when a defect is a white defect, and the threshold value 804 is the second threshold value when a defect is a black defect.

The threshold values 801 to 804 are values obtained by multiplying any set value, determined on the basis of, for example, an operation mode of the image pickup apparatus, and the brightness signal Y input from the brightness signal generating circuit 514 to each other. The reason why the threshold value is varied on the basis of the brightness signal Y is to take measures against an increase in noise as the brightness level is increased. Depending upon the amount of noise, the threshold value is changed, and the higher the brightness, the larger the threshold value, so that noise is less frequently determined as being a defect.

Inclinations 805, 806, 807 and 808 are also values obtained by multiplying any set value, determined on the basis of, for example, an operation mode of the image pickup apparatus, and the brightness signal Y input from the brightness signal generating circuit 514 to each other. Considering the LPF, BPF filter characteristics, the threshold values 801 and 802 at this time are set to values at which residual edge components are not detected. The threshold values 803 and 804 are set to values that minimize any adverse effect on image quality that is output, considering correction precision of the defective pixel correction method performed by the defective pixel correcting section 2081 from the level of a defective pixel to be detected and an output signal level of an object such as a point light source whose characteristics resemble those of the defective pixel. In multipliers 705, 706 and 707 in FIG. 7, results of multiplication of all outputs of the defect level converting circuits 701 to 704 are output as a defect level resulting from threshold determination for a target pixel.

Figure 9:
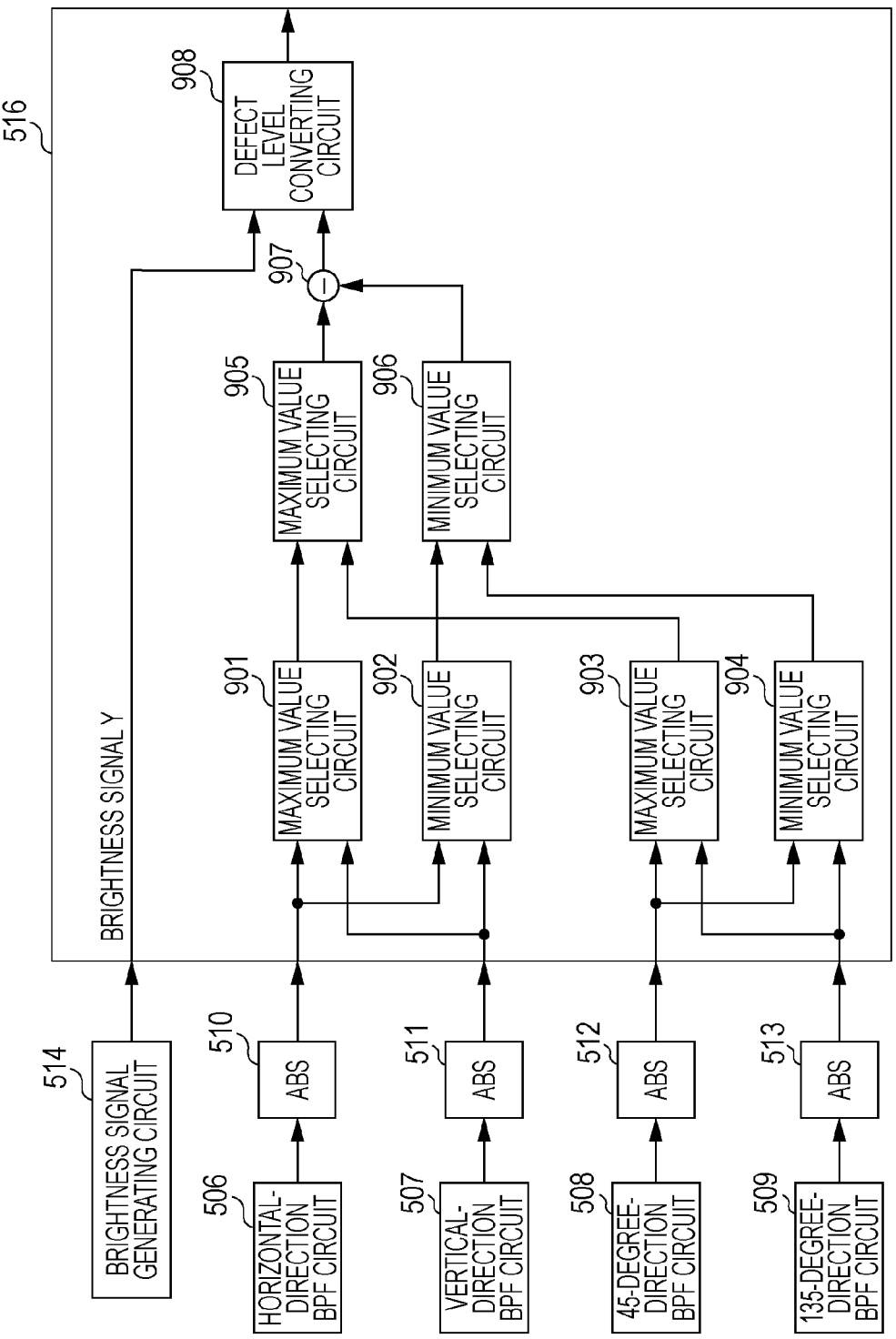
FIG. 9 is a block diagram for illustrating a correlation determining circuit in the third embodiment.

The absolute values of the four-direction BPF operation results from the ABS circuits 510 to 513 are input to a correlation determining circuit 516 in FIG. 5. In the correlation determining circuit 516, the magnitudes of the absolute values of the four-direction BPF operation results that are input are compared with each other, to determine whether or not the target pixel is a defective pixel. The correlation determining circuit 516 will be described with reference to FIG. 9.

A maximum value selecting circuit 901 compares the absolute value of the horizontal-direction BPF operation result input from the ABS circuit 510 and the absolute value of the vertical-direction BPF operation result input from the ABS circuit 511 with each other, to output the larger value. A minimum value selecting circuit 902 compares the absolute value of the horizontal-direction BPF operation result input from the ABS circuit 510 and the absolute value of the vertical-direction BPF operation result input from the ABS circuit 511 with each other, to output the smaller value.

A maximum value selecting circuit 903 compares the absolute value of the 45-degree-direction BPF operation result input from the ABS circuit 512 and the absolute value of the 135-degree-direction BPF operation result input from the ABS circuit 513 with each other, to output the larger value. A minimum value selecting circuit 904 compares the absolute value of the 45-degree-direction BPF operation result input from the ABS circuit 512 and the absolute value of the 135-degree-direction BPF operation result input from the ABS circuit 513, to output the smaller value.

A maximum value selecting circuit 905 compares the output of the maximum value selecting circuit 901 and the output of the maximum value selecting circuit 903 with each other, to output the larger value. This output represents the maximum value of all of the four-direction BPF operation results. The minimum value selecting circuit 906 compares the output of the minimum value selecting circuit 902 and the output of the minimum value selecting circuit 904 with each other, to output the smaller value. This output represents the minimum value of all of the four-direction BPF operation results.

In a subtracter 907, the output of the minimum value selecting circuit 906 is subtracted from the output of the maximum value selecting circuit 905. Since the subtraction result indicates the maximum difference of the four-direction BPF operation results, and is obtained by subtracting the minimum value of the absolute value from the maximum value of absolute value, the subtraction result is always a positive value that is greater than 0. A defect level converting circuit 908 converts the difference between the maximum value and the minimum value of the four-direction BPF operation results, which is an output of the subtracter 907, into a defect level, and outputs the defect level.

Figure 10:
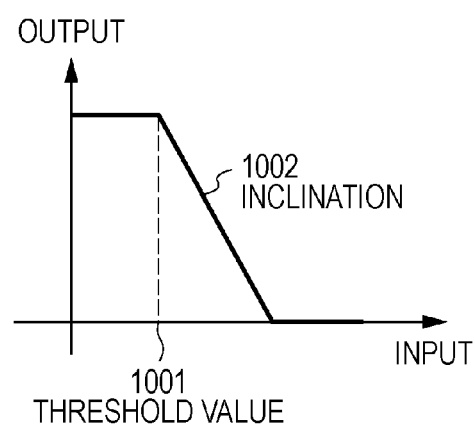
FIG. 10 illustrates a defect level converting circuit in the correlation determining circuit in the third embodiment.

FIG. 10 illustrates an operation of the defect level converting circuit 908. The horizontal axis of FIG. 10 represents input data of the defect level converting circuit 908. The vertical axis of FIG. 10 represents output data (8 bits) of the defect level converting circuit 908, and this corresponds to a defect level. A defect level of 0 indicates that a pixel is not a defective pixel, whereas a defect level of 255 indicates that a pixel is a defective pixel. When the difference between the maximum value and the minimum value of the four-direction BPF operation results that is input is less than a threshold value 1001, the defect level of 255 is output. A defect level that is greater than 0 and less than 255 indicates a pixel that cannot be easily distinguished from a normal pixel and a defective pixel.

The threshold value 1001 is a value obtained by multiplying an arbitrarily set value, determined on the basis of, for example, an operation mode of the image pickup apparatus, and the brightness signal Y, input from the brightness signal generating circuit 514, to each other. An inclination 1002 is also a value obtained by multiplying an arbitrarily set value, determined on the basis of, for example, an operation mode of the image pickup apparatus, and the brightness signal Y, input from the brightness signal generating circuit 514, to each other. The correlation determining circuit 516 outputs the operation result of the defect level converting circuit 908 as a defect level obtained by correlation determination for the target pixel. Although the defect levels at the threshold-value determining circuit 515 and at the correlation determining circuit 516 are each 8 bits, the defect levels are not limited thereto. Therefore, the bit widths may differ from each other.

The multiplier 517 in FIG. 5 multiplies the defect level output from the threshold-value determining circuit 515 and the defect level output from the correlation determining circuit 516 with each other. Here, the threshold-value determining circuit 515 may erroneously determine noise as a defect (defective pixel) when the level of the noise is high. The correlation determining circuit 516 sees variations in the differences between the target pixel and pixels surrounding the target pixel in an obliquely upward-downward direction and an obliquely left-right direction. Therefore, if the level of the noise is high, the differences vary, and it is possible to determine that the noise is not a defect (is not a defective pixel). That is, it has the role of preventing erroneous determination by the threshold-value determining circuit 515.

In contrast, when the target pixel is not a defective pixel, the defect level output from the correlation determining circuit 516 is such that the four-direction BPF operation results become values close to zero. In order to also set the difference between the maximum value and the minimum value thereof close to zero, the target pixel may be erroneously determined as being a defective pixel. In order to prevent such an erroneous determination, the threshold-value determining circuit 515 needs to determine that the target pixel is a defective pixel when there is a certain difference between the level of the target pixel and those of pixels surrounding the target pixel in the obliquely upward-downward direction and the obliquely left-right direction.

A selector 521 shown in FIG. 5 outputs the calculation result of the multiplier 517 as a defect level K when the defect flag 519 output from the white-defect black-defect determining circuit 518 is 1 (that is, the target pixel is a defective pixel). When the defect flag 519 is 0 (that is, the target pixel is not a defective pixel), 0 indicating that the target pixel is a normal pixel is output as the defect level K. The defect level K is output to the defective pixel correcting section 2082 from the selector 521.

Figure 11:
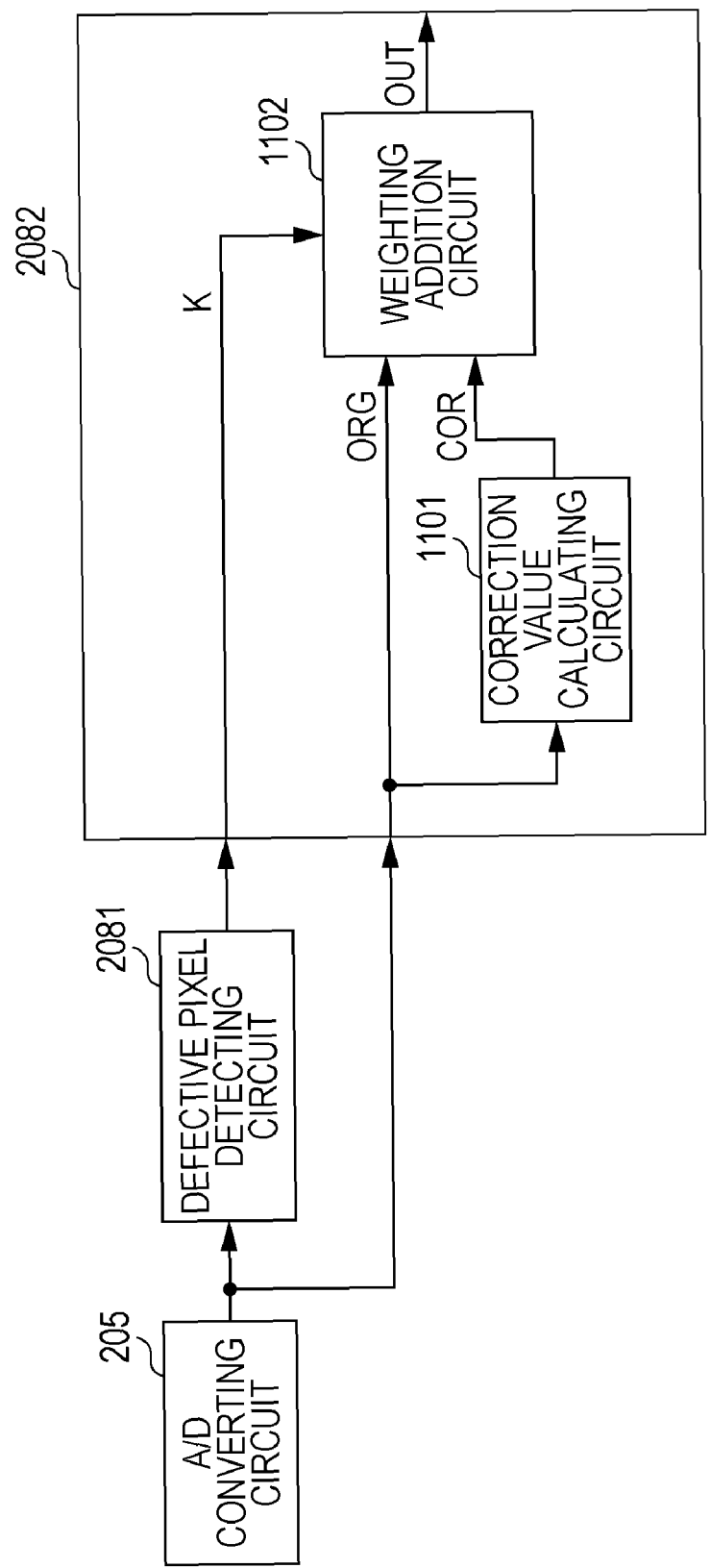
FIG. 11 is a block diagram for illustrating a defective pixel correcting section in the third embodiment.

Next, the defective pixel correcting section 2082 will be described with reference to FIG. 11. The image data including the defective pixel is input to the defective pixel correcting section 2082 from the A/D converting circuit 205, and the defect level K is input to the defective pixel correcting section 2082 from the defective pixel detecting section 2081. A correction value calculating circuit 1101 calculates a correction value COR by providing with respect to image data ORG, including the defective pixel input from the A/D converting circuit 205, a coefficient filter that does not cause the target pixel to be referred to, such as (1, 0, 1). It is possible to perform an edge-direction determination from the image data ORG, and refer to a pixel in the edge direction, to determine the correction value COR, or perform the aforementioned interpolation.

Next, in accordance with the value of the defect level K determined by the defective pixel detecting section 2081, a weighting addition circuit 1102 performs a weighting addition operation on the image data ORG input from the A/D converting circuit 205 and the correction value COR calculated at the correction value calculating circuit 1101. For example, the weighting addition operation is executed on the basis of the following formula:

$$\text{OUT}=COR \times K + ORG \times (255-K) \quad (8)$$

The values of the defect level K are from 0 to 255. When the target pixel is a normal pixel, K is close to 0, so that the value of the signal ORG is output. When the target pixel is a defective pixel, K is close to 255, so that the value of the signal COR is output. In this way, the data of the target pixel is replaced by the correction value COR.

Although, up until now, the case in which a G pixel is a defective pixel has been discussed, the above-described operations can similarly be executed when a R pixel or a B pixel is a defective pixel. That is, zero is inserted in the pixels other than the R pixels, or zero is inserted in the pixels other than the B pixels, to execute filtering in each direction.

According to the embodiment, when a signal of a desired spatial frequency bandwidth is extracted, it is possible to distinguish between an edge or noise and a defective pixel for a pixel that is previously determined as being a blinking defective pixel. In addition, even for a defective pixel which is not previously determined as being a defective pixel, it is possible to execute a defective pixel correction operation in which adverse effects on a taken image is reduced by changing the threshold value.

Fourth Embodiment

A feature of a fourth embodiment is that the image pickup apparatus includes a threshold value calculating section that changes a threshold value used in defect detection in accordance with the frequency with which a blinking defective pixel is turned on, that is, the frequency with which an output signal thereof is an abnormal value. An output of the threshold value calculating section is the threshold value used in the detection of a defective pixel at the defective pixel detecting section 2081 (the first threshold value in the second embodiment and the third embodiment).

Figure 12:
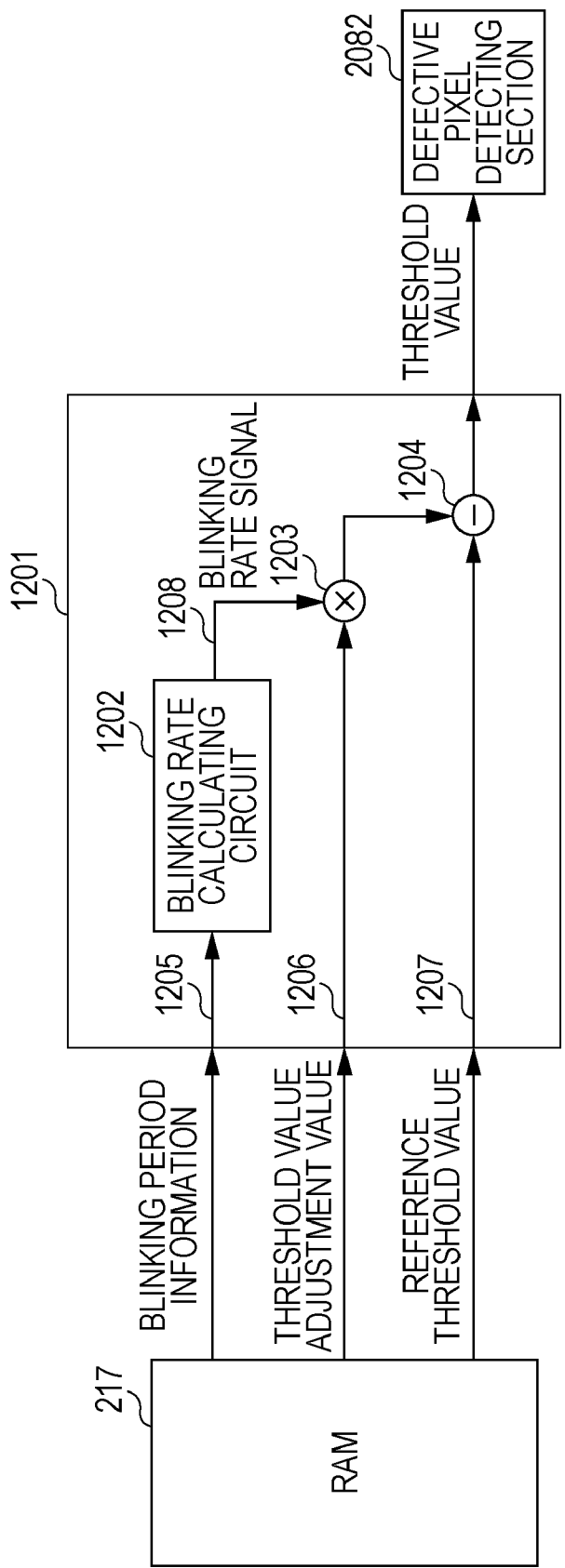
FIG. 12 is a block diagram for illustrating a threshold-value calculating section in a fourth embodiment.

A threshold value calculating section 1201 (threshold value calculating means or threshold value calculating unit) in the fourth embodiment will be described with reference to FIG. 12. Blinking period information 1205 of blinking defective pixels, a threshold value adjustment value 1206 for adjusting the threshold value, a reference threshold value 1207, all of which are previously stored in ROM 216, are transferred to RAM 217; are temporarily stored in RAM 217; and are output to the threshold value calculating section 1201. Here, the blinking period information 1205 represents information relating to the frequency with which a blinking defective pixel is turned on, that is, the frequency with which an output signal thereof is an abnormal value.

The blinking period information 1205 input to the threshold value calculating section 1201 is converted into a blinking rate signal 1208 at a blinking rate calculating circuit 1202. The blinking rate signal 1208 is a signal indicating the rate by which blinking defective pixels become defective pixels. If, for example, the blinking frequency is 1 out of 4 times, ¼ is output. The blinking rate signal output from the blinking rate calculating circuit 1202 is input to a multiplier 1203, and is multiplied with the threshold value adjustment value 1206. Next, an output of the multiplier 1203 is input to a subtracter 1204, and is subtracted from the reference threshold value 1207. An output of the subtracter 1204 is input to the defective pixel detecting section 2082, and becomes a threshold value used in defective pixel detection of a blinking defective pixel at the defective pixel correcting section 2082.

Here, when, as shown in FIG. 3B, the blinking defective pixel is behaving like a defective pixel having a relatively large amplitude, the reference threshold value 1207 becomes a value that is detected as a defect at the defective pixel detecting section 2081. When a high-frequency component exists at the blinking defective pixel as shown in FIG. 3C, the threshold value adjustment value 1206 is a value obtained by subtracting from the reference threshold value 1207 the output value of the defect detection operation in step S103 performed by the defective pixel detecting section 2081. In this case, from Formulas 2 and 4, 215−100=115.

When the blinking rate signal 1208 is ¼, and when ¼ is multiplied to the threshold value adjustment value 1206 and this product is subtracted from the reference threshold value 1207, "215−(115×(¼))=187 . . . (9)" is output, and the output becomes a threshold value of the defective pixel detection at the defective pixel detecting section 2081.

Accordingly, in the embodiment, by changing the threshold value used in the detection of defective pixels in accordance with the frequency with which the blinking defective pixels are turned on, the blinking defective pixels that frequently behave as defective pixels tend to be detected as defects, thereby making it possible to reduce image quality degradation resulting from the blinking defective pixels. Since the blinking defective pixels are not always defects, and the blinking rate signal is a value that is less than 1, when the threshold value adjustment value 1206 is a difference value between a component resulting from the blinking defective pixel and a component resulting from the high-frequency component, it is possible to reduce erroneous detection caused by the high-frequency component even for blinking defective pixels having relatively short blinking periods.

The present invention is not limited to any one of the first to fourth embodiments, so that various modifications may be made within a scope not departing from the gist of the present invention.

The present invention is realized by executing the following operations. That is, software (program) for executing the functions in the above-described embodiments is supplied to a system or a device through a network or various storage media, and a computer of the device or the system (or, for example, CPU or MPU) reads out the program to execute the program.

According to the present invention, it is possible to reduce adverse effects resulting from excessively correcting an output signal of a blinking defective pixel.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Application No. PCT/JP2009/067353, filed Oct. 5, 2009, which is hereby incorporated by reference herein in its entirety.

The invention claimed is:

1. An image pickup apparatus comprising:
   an image pickup element that performs photoelectric conversion on incident light from an object;
   correcting means that corrects an output signal value of a blinking defective pixel using an output signal value of a surrounding pixel, the blinking defective pixel unsteadily outputting a signal of an abnormal value in the image pickup element;
   determining means that determines whether or not the output signal value of the blinking defective pixel is the abnormal value by smoothening the output signal value of the blinking defective pixel and the output signal value of the surrounding pixel, by calculating an absolute value of a difference between the output signal value of the blinking defective pixel and a result of the smoothening as a value indicating a degree of defect of the blinking defective pixel, and by comparing the value indicating the degree of defect with a predetermined threshold value; and
   controlling means that performs control so that the output signal value of the blinking defective pixel is corrected by the correcting means when the determining means determines that the output signal value of the blinking defective pixel is the abnormal value, and that performs the control so that the output signal value of the blinking defective pixel is not corrected by the correcting means when the determining means determines that the output signal value of the blinking defective pixel is not the abnormal value.

2. The image pickup apparatus according to claim 1, further comprising storage means that previously stores a steady defective pixel, which steadily outputs a signal of the abnormal value, and the blinking defective pixel,
   wherein the determining means determines whether or not the output signal value of the blinking defective pixel is the abnormal value by comparing the value indicating the degree of defect of the blinking defective pixel with a first threshold value, and determines whether or not an output signal value of a pixel that is not stored in the storage means as the steady defective pixel and the blinking defective pixel is the abnormal value by comparing a value indicating a degree of defect of the pixel that is not stored in the storage means as the steady defective pixel and the blinking defective pixel with a second threshold value.

3. The image pickup apparatus according to claim 1, wherein the determining means includes filter means that cuts off a direct-current component in at least two directions in the blinking defective pixel, and calculates an absolute value of output data of the filter means as the value indicating the degree of defect.

4. The image pickup apparatus according to claim 1, comprising storage means that stores information regarding frequency with which the output signal value of the blinking defective pixel becomes the abnormal value, and threshold value calculating means that calculates the predetermined threshold value in accordance with the information regarding the frequency.

5. A defective pixel correction method of an image pickup apparatus including an image pickup element that performs photoelectric conversion on incident light from an object, the method comprising:
   a correcting step of correcting an output signal value of a blinking defective pixel using an output signal value of a surrounding pixel, the blinking defective pixel unsteadily outputting a signal of an abnormal value in the image pickup element; and
   a controlling step in which the output signal value of the blinking defective pixel and the output signal value of the surrounding pixel are smoothened, an absolute value of a difference between the output signal value of the blinking defective pixel and a result of the smoothening is calculated as a value indicating a degree of defect of the blinking defective pixel, and the value indicating the degree of defect is compared with a predetermined threshold value, so that control is performed such that the output signal value of the blinking defective pixel is corrected in the correcting step when it is determined that the output signal value of the blinking defective pixel is the abnormal value in determining whether or not the output signal value of the blinking defective pixel is the abnormal value, and so that the control is performed such that the output signal value of the blinking defective pixel is not corrected in the correcting step when it is determined that the output signal value of the blinking defective pixel is not the abnormal value in determining whether or not the output signal value of the blinking defective pixel is the abnormal value.

6. The defective pixel correction method according to claim 5, wherein a steady defective pixel, which steadily outputs a signal of the abnormal value, and the blinking defective pixel are previously stored and, wherein, in the controlling step, it is determined whether or not the output signal value of the blinking defective pixel is the abnormal value by comparing the value indicating the degree of defect of the blinking defective pixel with a first threshold value, and it is determined whether or not an output signal value of a pixel that is not stored as the steady defective pixel and the blinking defective pixel is the abnormal value by comparing a value indicating a degree of defect of the pixel that is not stored as the steady defective pixel and the blinking defective pixel with a second threshold value.

7. The defective pixel correction method according to claim 5, wherein, in the controlling step, filtering that cuts off a direct-current component in at least two directions in the blinking defective pixel is executed, and an absolute value of output data of the filtering is calculated as the value indicating the degree of defect.

8. The defective pixel correction method according to claim 5, wherein the predetermined threshold value is calculated in accordance with information regarding frequency with which the output signal value of the blinking defective pixel becomes the abnormal value.

9. An image pickup apparatus comprising:
an image pickup element that performs photoelectric conversion on incident light from an object;
correcting means that corrects an output signal value of a blinking defective pixel using an output signal value of a surrounding pixel, the blinking defective pixel unsteadily outputting a signal of an abnormal value in the image pickup element;
determining means that determines whether or not the output signal value of the blinking defective pixel is the abnormal value by comparing a value indicating the degree of defect of the blinking defective pixel with a predetermined threshold value; and
controlling means that performs control so that the output signal value of the blinking defective pixel is corrected by the correcting means when the determining means determines that the output signal value of the blinking defective pixel is the abnormal value, and that performs the control so that the output signal value of the blinking defective pixel is not corrected by the correcting means when the determining means determines that the output signal value of the blinking defective pixel is not the abnormal value,
wherein the determining means includes filter means that cuts off a direct-current component in at least two directions in the blinking defective pixel, and calculates an absolute value of output data of the filter means as the value indicating the degree of defect.

10. An image pickup apparatus comprising:
an image pickup element that performs photoelectric conversion on incident light from an object;
correcting means that corrects an output signal value of a blinking defective pixel using an output signal value of a surrounding pixel, the blinking defective pixel unsteadily outputting a signal of an abnormal value in the image pickup element;
storage means that stores information regarding frequency with which the output signal value of the blinking defective pixel becomes the abnormal value;
threshold value calculating means that calculates a predetermined threshold value in accordance with the information regarding the frequency;
determining means that determines whether or not the output signal value of the blinking defective pixel is the abnormal value by comparing a value indicating a degree of defect of the blinking defective pixel with the predetermined threshold value; and
controlling means that performs control so that the output signal value of the blinking defective pixel is corrected by the correcting means when the determining means determines that the output signal value of the blinking defective pixel is the abnormal value, and that performs the control so that the output signal value of the blinking defective pixel is not corrected by the correcting means when the determining means determines that the output signal value of the blinking defective pixel is not the abnormal value.

11. A defective pixel correction method of an image pickup apparatus including an image pickup element that performs photoelectric conversion on incident light from an object, the method comprising:
a correcting step of correcting an output signal value of a blinking defective pixel using an output signal value of a surrounding pixel, the blinking defective pixel unsteadily outputting a signal of an abnormal value in the image pickup element; and
a controlling step in which filtering that cuts off a direct-current component in at least two directions in the blinking defective pixel is executed, an absolute value of output data of the filtering is calculated as a value indicating a degree of defect of the blinking defective pixel, and the value indicating the degree of defect is compared with a predetermined threshold value, so that control is performed such that the output signal value of the blinking defective pixel is corrected in the correcting step when it is determined that the output signal value of the blinking defective pixel is the abnormal value in determining whether or not the output signal value of the blinking defective pixel is the abnormal value, and so that the control is performed such that the output signal value of the blinking defective pixel is not corrected in the correcting step when it is determined that the output signal value of the blinking defective pixel is not the abnormal value in determining whether or not the output signal value of the blinking defective pixel is the abnormal value.

12. A defective pixel correction method of an image pickup apparatus including an image pickup element that performs photoelectric conversion on incident light from an object, the method comprising:
a correcting step of correcting an output signal value of a blinking defective pixel using an output signal value of a surrounding pixel, the blinking defective pixel unsteadily outputting a signal of an abnormal value in the image pickup element; and a controlling step in which the value indicating a degree of defect of the blinking defective pixel is compared with a predetermined threshold value, so that control is performed such that the output signal value of the blinking defective pixel is corrected in the correcting step when it is determined that the output signal value of the blinking defective pixel is the abnormal value in determining whether or not the output signal value of the blinking defective pixel is the abnormal value, and so that the control is performed such that the output signal value of the blinking defective pixel is not corrected in the correcting step when it is determined that the output signal value of the blinking defective pixel is not the abnormal value in determining whether or not the output signal value of the blinking defective pixel is the abnormal value, wherein the predetermined threshold value is calculated in accordance with information regarding a frequency with which the output signal value of the blinking defective pixel becomes the abnormal value.

* * * * *